United States Patent
Meingast et al.

(10) Patent No.: US 11,092,682 B1
(45) Date of Patent: Aug. 17, 2021

(54) DETERMINING ARRIVAL AND DEPARTURE LATENCY FOR WIFI DEVICES IN AN ENVIRONMENT

(71) Applicant: GOOGLE LLC, Mountain View, CA (US)

(72) Inventors: Marci Meingast, San Francisco, CA (US); Andrew Axley, Mountain View, CA (US); Daniele Midi, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/864,040

(22) Filed: Apr. 30, 2020

(51) Int. Cl.
    *G01S 11/02* (2010.01)
    *G01S 5/02* (2010.01)
    (Continued)

(52) U.S. Cl.
    CPC ............. *G01S 11/026* (2013.01); *G01S 5/021* (2013.01); *G01S 5/0242* (2013.01); *H04B 17/27* (2015.01); *H04W 76/11* (2018.02)

(58) Field of Classification Search
CPC ...... G01S 11/02; G01S 11/022; G01S 11/026; G01S 11/06; G01S 11/12; G01S 5/012; G01S 5/015; G01S 2205/02; G01S 5/0252; G01S 5/0249; G01S 7/2806; G01S 5/02; G01S 5/021; G01S 5/0242; G01S 5/011; H04W 76/11; H04W 4/02; H04W 4/021; H04W 4/185; H04W 12/1004; H04W 4/38; H04W 4/30; H04W 4/35; H04W 4/33; H04W 84/22; H04W 88/00; H04W 88/02; H04W 88/08; H04W 88/085; H04W 92/10; H04W 76/30; H04W 76/38; H04W 60/00; H04W 60/04; H04W 60/06; H04W 64/00; H04W 68/00; H04W 68/005; H04W 24/00; H04W 24/10; H04W 12/1206; H04W 12/1202; H04W 12/00516; H04W 12/00504; H04W 12/00503; H04W 12/00502; H04W 12/005; H04W 12/00407; H04W 4/70; H04W 4/80; H04W 4/90; H04W 28/0819; H04W 28/0823;
(Continued)

(56) References Cited

U.S. PATENT DOCUMENTS 9,900,741 B2 * 2/2018 Lu et al. ............... H04W 4/021
10,158,979 B2 * 12/2018 Ahuja et al. ............ H04W 4/04
(Continued)

*Primary Examiner* — Meless N Zewdu
(74) *Attorney, Agent, or Firm* — Butzel Long

(57) ABSTRACT

Systems and techniques are provided for determining arrival and departure latency for WiFi devices. Reports may be received from WiFi access points in an environment. The reports include an indication of a connection to or disconnection from one of the WiFi access points, a time of the connection or disconnection, and an identifier of the one of the WiFi access points. Data including connect times and disconnect times may be generated from the reports. Sensor and device data may be received from one or more sensors or devices in the environment. Data indicating a length of an arrival latency and a length of a departure latency for the environment may be generated with a machine learning system, where the data including connect times and disconnect times and the sensor and device data is input to the machine learning system.

20 Claims, 6 Drawing Sheets

(51) Int. Cl.
*H04B 17/27* (2015.01)
*H04W 76/11* (2018.01)

(58) Field of Classification Search
CPC . H04W 28/0827; H04W 76/00; H04W 84/00; H04W 12/047; H04W 12/08; H04W 12/104; H04W 12/009; H04W 12/65; H04W 12/73; H04B 17/27; H04B 17/18; H04B 17/309; H04B 17/364
See application file for complete search history.

(56) References Cited

U.S. PATENT DOCUMENTS

| | | | |
|---|---|---|---|
| 10,735,909 B1* | 8/2020 | Klinkner et al. | H04W 4/029 |
| 10,771,924 B2* | 9/2020 | Colonna et al. | H04W 4/029 |
| 10,812,944 B2* | 10/2020 | Mahmoud et al. | H04W 4/029 |
| 2014/0105003 A1* | 4/2014 | Austin et al. | H04W 28/08 |
| 2016/0212776 A1* | 7/2016 | MacDonald et al. | H04W 76/021 |
| 2017/0191836 A1* | 7/2017 | Korneluk et al. | G01C 21/20 |
| 2017/0330240 A1* | 11/2017 | Fonzi et al. | G06Q 30/0269 |
| 2018/0124630 A1* | 5/2018 | Ringland et al. | H04W 28/0205 |
| 2019/0244498 A1* | 8/2019 | Dumas | G08B 13/19656 |
| 2019/0342714 A1* | 11/2019 | Pylalappan et al. | H04W 4/029 |

* cited by examiner

DETERMINING ARRIVAL AND DEPARTURE LATENCY FOR WIFI DEVICES IN AN ENVIRONMENT

BACKGROUND

A WiFi access point in an environment may have a signal range that allows for WiFi devices to connect to the WiFi access point from outside of the environment. This may result in a WiFi device being carried by a person approaching the environment connecting to the WiFi access point before the person has entered the environment. It may also result in a WiFi device being carried by a person leaving the environment staying connected to the WiFi access point for some time after the person has left the environment.

BRIEF SUMMARY

According to an embodiment of the disclosed subject matter, reports may be received from WiFi access points in an environment. Each of the reports may include an indication of a connection to or disconnection from one of the WiFi access points, a time of the connection or disconnection, and an identifier of the one of the WiFi access points. Data including connect times and disconnect times may be generated from the reports. Sensor and device data may be received from sensors or devices in the environment. Data indicating a length of an arrival latency and a length of a departure latency for the environment may be generated with a machine learning system, where the data including connect times and disconnect times and the sensor and device data is input to the machine learning system.

An indication of presence or an indication of absence for a user in the environment may be adjusted with the arrival latency or the departure latency.

A control signal for a controllable device in the environment may be generated based on the indication of presence or the indication absence after the adjusting of at least one of the indication of presence and the indication of absence. The control signal may be sent to the device to be implemented by the device.

The machine learning system may use an arrival model to generate the arrival latency. The machine learning system may use a departure model to generate the departure latency.

The report further may include an identifier of the WiFi device. The identifier of the WiFi device may include a salted hashed media access control address (SHMAC).

The sensors and devices in the environment may include a motion sensor or an entryway sensor.

The reports may include an identifier of a WiFi device. Data indicating a length of an arrival latency and a length of a departure latency may be generated with the machine learning system for each WiFi device with an identifier in one of the reports, where the data including connect times and disconnect times and the sensor and device data is input to the machine learning system.

According to an embodiment of the disclosed subject matter, a means for receiving, from WiFi access points in an environment, reports, wherein each of the reports may include an indication of a connection to or disconnection from one of the WiFi access points, a time of the connection or disconnection, and an identifier of the one of the WiFi access points, a means for generating, from the reports, data including connect times and disconnect times, a means for receiving, from one or more sensors or devices in the environment, sensor and device data, a means for generating, with a machine learning system, data indicating a length of an arrival latency and a length of a departure latency for the environment, wherein the data may include connect times and disconnect times and the sensor and device data is input to the machine learning system, a means for generating a control signal for a controllable device in the environment based on the indication of presence or the indication absence after the adjusting of at least one of the indication of presence and the indication of absence, a means for sending the control signal to the device to be implemented by the device, and a means for generating, with the machine learning system, data indicating a length of an arrival latency and a length of a departure latency for each WiFi device with an identifier in one of the reports, wherein the data including connect times and disconnect times and the sensor and device data is input to the machine learning system, are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
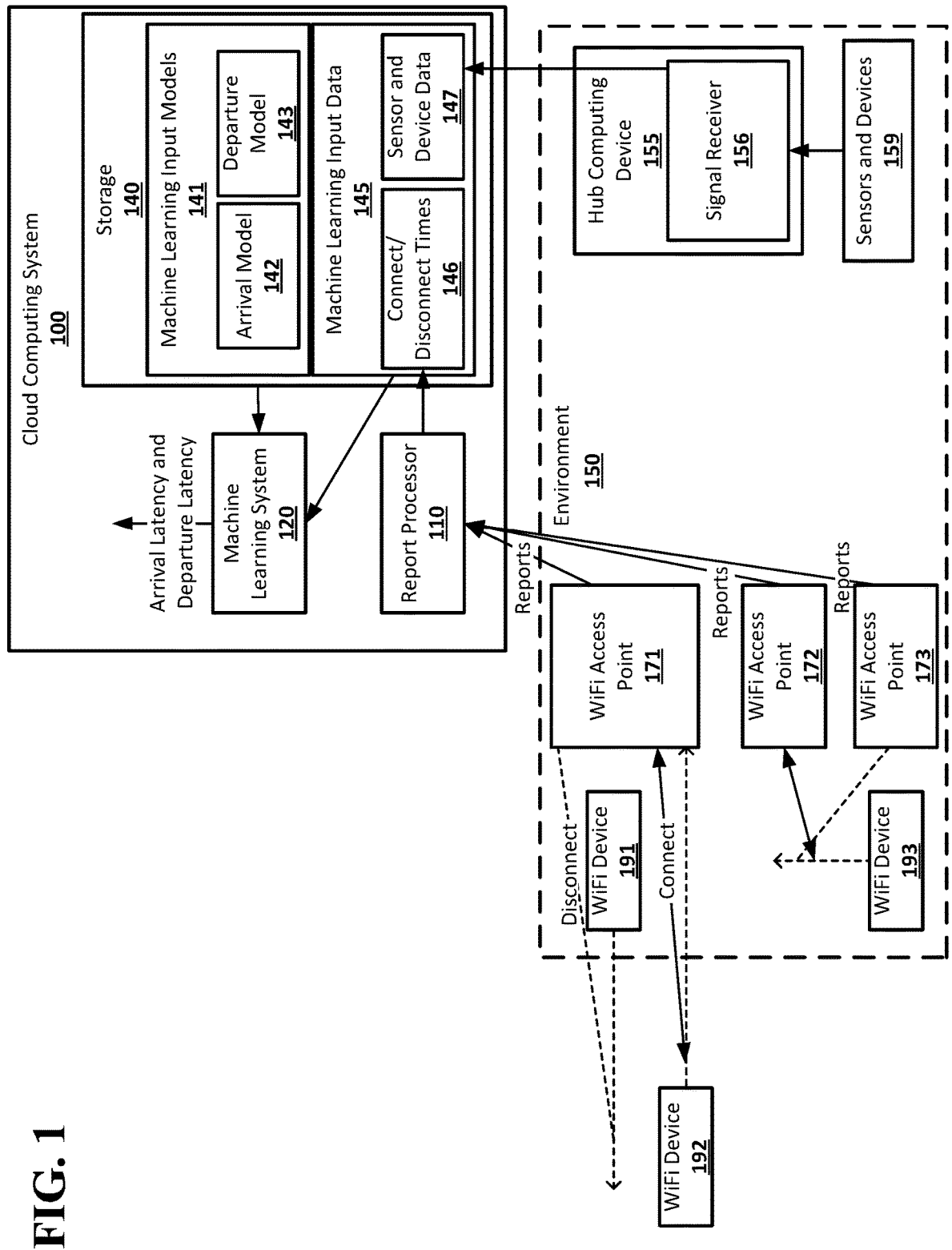
FIG. 1 shows an example system and arrangement suitable for determining arrival and departure latency for WiFi devices according to an implementation of the disclosed subject matter.

According to embodiments disclosed herein, determining arrival and departure latency for WiFi devices may allow connections to and disconnections from WiFi access points in an environment by WiFi devices to be used along with signals from other sensors and devices in the environment to determine latencies of connection and disconnection for WiFi devices arriving at and departing from the environment. WiFi access points in the environment may send, to a cloud computing system, reports that include the times connections and disconnections by WiFi devices are detected. The reports may be used along with signals from sensors and devices in the environment as input to a machine learning system. The machine learning system may determine the latency between the connection of a WiFi device to a WiFi access point in the environment and the arrival of a person carrying the WiFi device inside the environment and the latency between the departure from the environment of a person carrying the WiFi device and the disconnection of the WiFi device from all WiFi access points in the environment.

An environment may include a number of WiFi access points. The environment may be, for example, structure, such as a home, office, apartment, or other environment that may include indoor and outdoor spaces, and may include entryways that people use to enter and exit the environment. The WiFi access points may be distributed throughout the environment, and may, for example, form a mesh network or a hub-and-spoke network. The WiFi access points may provide WiFi devices that connect to the WiFi access points with access to local area network (LAN), and to a wide area network (WAN), such as the Internet. Access to a WAN may be provided through any suitable wired or wireless WAN connection that the WiFi access points may have access to, for example, through a connection to a wired or wireless modem.

The ranges over which the WiFi access points may be able to broadcast and receive WiFi signals may extend beyond the entryways of the environment. This may allow for WiFi devices to connect, or remain connected, to WiFi access points within the environment while the WiFi devices are outside the environment. For example, a phone may be able to connect to a WiFi access point in a house before the phone has entered the house or remain connected to a WiFi access point within the house after the phone has exited the house.

WiFi devices may connect to and disconnect from the WiFi access points in the environment. The WiFi devices may be any suitable devices that includes WiFi radios that allow the WiFi devices to connect to WiFi networks. A WiFi device may be, for example a phone, tablet, laptop, watch or other wearable device, or WiFi enabled tracking tag. As WiFi devices move within the environment and enter and exit the environment, the WiFi devices may connect to disconnect from the different WiFi access points throughout the environment depending on the locations of the WiFi devices and the ranges of the WiFi access points. For example, a WiFi device may start on the third floor of a house and connect to a WiFi access point on that floor. The WiFi device may move to the second floor of the house, disconnect from the WiFi access point on the third floor and connect to a WiFi access point on the second floor. The WiFi device may move to the first floor of the house, disconnect from the WiFi access point on the second floor and connect to a WiFi access point on the first floor. The WiFi device may exit the house and disconnect from the WiFi access point on the first floor. The WiFi device may later re-enter the house and connect to the WiFi access point on the first floor.

There may be latency between the time a WiFi device being carried by a person arriving at an environment connects to a WiFi access point in the environment and the time the person carrying the WiFi device enters the environment. This may be arrival latency for the environment. For example, when a person carrying a phone approaches an entryway to the house, the phone may connect to the WiFi access point on the first floor five seconds before the person has entered the house through the entryway and brought the phone inside the house, due to the range of the WiFi signal from the WiFi access point extending outside of the house. The arrival latency for the house may be five seconds.

There may also be latency between the time a person carrying a WiFi device departs an environment and the time the WiFi device disconnects from a WiFi access point in the environment. This may be departure latency for the environment. For example, when the person carrying the phone departs the house, the person may exit the house through the entryway and move away from the house for six seconds before the phone disconnects from the WiFi access point on the first floor of the house. The WiFi access point may not detect the disconnection of a WiFi device for some amount of time after the disconnection occurs on the WiFi device, which may add additional latency to the departure latency.

The WiFi access points in an environment may report connections to and disconnections from WiFi access points by the WiFi devices. The connections and disconnections may be reported to, for example, a cloud computing system, which may be remote from the environment, through an Internet connection. The WiFi access points may report the connections and disconnections of the WiFi devices in real-time, as they occur, or may report them at any other suitable time and interval. For example, a WiFi access point on the third floor of a house may report to the cloud computing system the connection of the WiFi device upon the connection being successfully established and may report the disconnection of the WiFi device upon detecting the disconnection.

Reports of connections and disconnections of the WiFi devices sent to the cloud computing system may include any suitable data, including identifiers for the WiFi devices, an identifier for the WiFi access point sending the report, an indication of whether the report is for a connection or a disconnection, and the connect time or disconnect time indicating the time at which the WiFi access point detected the connection or disconnection. The connect time or disconnect time included in a report may be specified with any suitable level of precision, and may, for example, include the time and date specified in any suitable format. The identifier for the WiFi access point may be any suitable identifier that may allow the cloud computing system to distinguish reports from different WiFi access points in the same environment. The identifier for a WiFi access point may, for example, be based on a MAC address of a component of the WiFi access point, or may be an identifier assigned to the WiFi access point by a user.

The identifiers for the WiFi devices may be privacy preserving identifiers that may allow the cloud computing system to distinguish reports for different WiFi device from each other but may not allow for positive identification of the WiFi devices themselves or of the user of the WiFi devices. For example, an identifier for a WiFi device may be based on a media access control (MAC) address of the WiFi device, for example, a salted hashed MAC (SHMAC) generated when the user opts-in to allow the cloud computing system to receive reports from the WiFi access points in the environment. The SHMAC for a WiFi device may be generated by, for example, the WiFi access points, and may be sent to the cloud computing system in reports for the WiFi device. The user may also enter SHMACs, or any other suitable identifiers for the WiFi devices, directly to the WiFi access points or the cloud computing system. The SHMACs may allow for all reports received by the cloud computing system that include the same SHMAC to be considered to be reports for the same WiFi device, but may not allow the cloud computing system to identify the WiFi devices, for example, by determining MAC addresses or other such identifiers that can be used to identify physical WiFi devices.

The cloud computing system may receive data from other devices and sensors within the environment. The environment may, for example, include a hub computing device. The hub computing device may be any suitable computing device for managing sensors and other systems, such as automation systems, within the environment. The hub computing device may be, for example, a controller for an environment. For example, the hub computing device may be or include a thermostat, security hub, or other computing device located within the environment. The hub computing device also may be another device within the environment or may be a separate computing device dedicated to managing the environment that may be connected to devices in the environment through, for example, the Internet. The hub computing device may be connected, through any suitable wired, wireless, local, and wide area connections, to a number of sensors and controllable devices distributed throughout an environment. For example, the hub computing device, sensors, and other components of the environment may be connected in a mesh network. Some of the sensors may, for example, be motion sensors, including passive infrared sensors used for motion detection, light sensors, cameras, microphones, entryway sensors, light switches, as well as mobile device scanners that may use Bluetooth, WiFi, RFID, or other wireless devices as sensors to detect the presence of devices such as phones, tablets, laptops, or fobs. Sensors may be distributed individually or may be combined with other sensors in sensor devices. For example, a sensor device may include a low power motion sensor and a light sensor, or a microphone and a camera, or any other combination of available sensors.

The hub computing device may receive signals including data from sensors and other devices throughout the environment and send data from the signals to the cloud computing system. The data may include, for example, open/close events detected by sensors that monitor entryways such as external doors of the environment and motions detected by motion sensors that monitor areas around the entryways of the environment, data indicating when devices, including lights, appliances, and AN equipment, have been turned on or off based on input from a user, rather than through automated control by the hub computing device or cloud computing system, the status of a security system for the environment, including times when the security system transitions from an armed mode to a disarmed mode, or from the disarmed mode to the armed mode, and any other suitable data that may be indicative of whether a person has entered or exited the environment. In some implementations, the data from the sensors and other devices may be sent to the cloud computing system through the WiFi access points directly, as the hub computing device may be wholly part of the cloud computing system with computational capacity located offsite from the environment.

The cloud computing system may use the connect and disconnect times for WiFi devices from the reports received from the WiFi access points in an environment and the data received from other devices and sensors in the environment to determine the arrival latency and departure latency for the environment. For example, the cloud computing system may include a machine learning system. The machine learning system may be any suitable machine learning system, such as, for example, an artificial neural network such as deep learning neural networks, a Bayesian network, support vector machine, classifier of any type, or any other suitable statistical or heuristic machine learning system type. The machine learning system may include models, such as an arrival model for determining the arrival latency and a departure model for determining the departure latency. The models may be generated by training the machine learning system in any suitable manner. For example, the models may be generated using supervised or unsupervised offline training of the machine learning system, or through supervised or unsupervised online learning. For example, the machine learning system may be a neural network, the arrival model may include both a neural network environment and a set of weights to be used with the neural network environment, and the departure model may include a neural network environment and a set of weights for the neural network environment. The neural network environments for the arrival model and the departure model may be the same, or may be different, and the sets of weights for the arrival model and the departure model may be different.

The connect and disconnect times for WiFi devices from the reports received from the WiFi access points in an environment and the data received from other devices and sensors in the environment may be used by the cloud computing system as input data for the machine learning system. The machine learning system may generate and output data that may indicate the length of the arrival latency and the length of the departure latency.

The input data may be input to the machine learning system in any suitable manner and may be processed through any number of models by the machine learning system. For example, the input data may be processed through both the arrival model and the departure model. The arrival model may output data indicating the length of the arrival latency, and the departure model may output data indicating the length of the departure latency. The machine learning system may output both the data indicating the length of the arrival latency and the data indicating the length of the departure latency.

For example, the cloud computing system may receive reports from the WiFi access points in a house for all of the WiFi devices, identified by SHMACs, that connect to and disconnect from the WiFi access points in the house. The WiFi devices may include WiFi devices that are more mobile, such as phones, tablets, laptops, and wearable devices, and WiFi devices that may be less mobile, such as TVs, game consoles, and desktop computers. The cloud computing system may also receive data from other devices and sensors in the house including motion sensors and entryway sensors that monitor the external doors of the house and entryways near the external doors of the house. The cloud computing system may input the connect and disconnect times from the reports received from the WiFi access points and the data received from other sensors and devices in the environment to the machine learning system. The input to the machine learning system may first be processed through the arrival model. The machine learning system may output data indicating the length of the arrival latency for the house. The data indicating the length of the arrival latency may be in any suitable format and may be interpretable as a length of time. For example, the machine learning system using the arrival model may output a number that may be the arrival latency in milliseconds. The arrival latency may be based on, for example, correlations made by the machine learning system between times that WiFi devices connect to WiFi access points in the house and times that motion sensors, entryway sensors, and other devices in the house generate signals that correspond to a person entering the house through an external door. The input to the machine learning system may then be processed through the departure model. The machine learning system may output data indicating the length of the departure latency for the house. The departure latency may be based on, for example, correlations made by the machine learning system between times that WiFi devices disconnect from WiFi access points in the house and times that motion sensors, entryway sensors, and other devices in the house generate signals that correspond to a person exiting the house through an external door.

The arrival latency and departure latency determined by the machine learning system may be generalized to all WiFi devices that connect to and disconnect from WiFi access points in the environment. For example, the machine learning system may be used to determine a single arrival latency and a single departure latency for an environment, and these arrival and departure latencies may be considered to apply to any WiFi device that connects to or disconnects from a WiFi access point in the environment.

The arrival latency and departure latency may also be determined on a per-device basis. For example, instead of including connect and disconnect times from all reports in the input data for the machine learning system, different sets of input data may be generated with each set including connect and disconnect times from reports that include a different SHMAC. For example, if there are five different SHMACs in the reports received from the WiFi access points, corresponding to five different WiFi devices, five different sets of input data may be generated, with each set including connect and disconnect times from reports for one of the five WiFi devices. The sets of input data may be used to generate five separate pairs of arrival and departure latencies, one for each of the five WiFi devices that connected to or disconnected from a WiFi access point in the environment.

The arrival latency and departure latency may also be determined on a per-entryway basis. For example, instead of including all data from sensors and other devices in the input data for the machine learning system, different sets of input data may be generated with each set including data from sensors and other devices for a different entryway of the environment. For example, if an environment has two external doors, two different sets of input data may be generated, each one including the data from sensors and other devices that monitor or correlate to the use of a different one of the external doors. The sets of input data may be used to generate two separate pairs of arrival and departure latencies, one for each of the entryways to the environment.

The input data may be input to the machine learning system at any suitable time and any suitable interval. For example, the cloud computing system may update the input data anytime a new report for any WiFi device is received from any of the WiFi access points or new data is received from any sensor or device in the environment. The cloud computing system may use the updated input data as input to the machine learning system immediately after any update, or after some set number of updates to the input data, generating updated arrival and departure latencies. The cloud computing system may also input the input data to the machine learning system based on timed intervals, such as, for example, once every hour. In some implementations, the arrival latency and departure latency for an environment may be determined once for an environment, for example, after the WiFi access points are initially setup within the environment and may not be determined again until a user requests that they be determined again.

The cloud computing system may use the arrival and departure latencies output by the machine learning system in any suitable manner. For example, the arrival and departure latencies may be used to adjust presence and absence determinations for persons in the environment that were made using connections to and disconnections from WiFi access points in the environment. If the arrival latency for an environment is five seconds, the cloud computing system may consider a user who was absent from the environment and whose WiFi device has just connected to a WiFi access point in the environment to be absent for an additional five seconds after the connection is made before determining that the user is present in the environment. Similarly, if the departure latency is six seconds, the cloud computing system may consider a user who was present in the environment and whose WiFi device disconnected from a WiFi access point in the environment to have been absent for an additional six seconds preceding the disconnection. This determination may be made retroactively after the disconnection is reported by the WiFi access point. The cloud computing system may use these adjusted presence and absence determinations when controlling controllable devices in the environment, such as lights, sensors, security devices, locks, A/V devices, HVAC systems, security systems, and motorized devices such as blinds, which may be controlled from the cloud computing system directly or through a computing device, such as the hub computing device, located in the environment. The cloud computing system may, for example, reduce the delay in changing a security system into an armed mode from a disarmed mode by the amount of the departure latency, reducing the amount of time the security system is in the disarmed mode after a person exits an environment and leaves it unoccupied. For example, if the delay on rearming the security system is set to ten seconds, and the departure latency is determined to be six seconds, the cloud computing system may reduce the delay on rearming the security system to four seconds. This may result in the security system rearming ten seconds after a person exits an environment and leaves it unoccupied, which may be four seconds after the person is determined to be absent from the environment based on their WiFi device disconnecting from a WiFi access point. Similarly, lights in an entryway may be turned on based on the arrival latency. For example, using an arrival latency of five seconds to adjust a presence determination for a user based on their WiFi device connecting to a WiFi access point in the environment may result in lights being turned on five seconds later than they would be if the presence determination was not adjusted using the arrival latency, and may allow the turning on of the light to occur closer to the time a person actually enters the environment.

In some implementations, the machine learning system may be part of the hub computing device for the environment. The reports from the WiFi access points and the data from devices and sensors in the environment may be received by the hub computing device. The hub computing device may determine the connect and disconnect times for WiFi devices from the reports and may use the connect and disconnect times along with the data received from other devices and sensors in the environment as input data for the machine learning system. The output from the machine learning systems indicating the lengths of the arrival and departure latencies may be used by the hub computing device to adjust presence and absence determinations made by the hub computing device, or may be sent to the cloud computing system.

FIG. 1 shows an example system suitable for determining arrival and departure latency for WiFi devices according to an implementation of the disclosed subject matter. A cloud computing system 100 may include a report processor 110, machine learning system 120, and storage 140. The cloud computing system 100 may be any suitable computing device or system, such as, for example, a computer 20 as described in FIG. 7, for implementing the report processor 110, the machine learning system 120, and the storage 140. The cloud computing system 100 may be, for example, a server system that provides cloud computing services using any suitable combinations of computing devices connected in any suitable manner distributed over any area. The report processor 110 may be any suitable combination of hardware or software for receiving reports from WiFi access points and processing the reports to generate connect/disconnect times 146. The machine learning system 120 may be any suitable combination of hardware and software for implementing a machine learning system that may generate data indicating that the lengths of an arrival latency and a departure latency for an environment. The storage 140 may be any suitable combination of hardware and software for implementing volatile and non-volatile storage.

The environment 150 may include WiFi access points 171, 172, and 173. The WiFi access points 171, 172, and 173 may be any suitable devices for creating a WiFi LAN that devices with WiFi may connect to. The WiFi access points 171, 172, and 173 may form a mesh network, or may be part of a hub-and-spoke network, and may connect to a WAN, such as the Internet, for example, through a wired or wireless modem connected to one or more of the WiFi access points 171, 172, and 173 through any suitable wired or wireless connection.

WiFi devices 191, 192, and 193 may be, for example, smartphones, tablets, wearable devices, or other portable WiFi equipped devices. The WiFi device 191 may be inside the environment 150 and connected to the WiFi access point 171. The WiFi device 192 may be outside of the environment 150 and may not be connected to any WiFi access point in the environment 150. The WiFi device 193 may be inside the environment 150 and connected to the WiFi access point 173. The WiFi device 191 may move towards an entryway to the environment 150, such as an external doorway, and may exit the environment 150 and continue to move away from the environment 150. For example, the WiFi device 191 may be a phone carried by a person departing the environment 150. The WiFi device 191 may remain connected to the WiFi access point 171 for some amount of time after exiting the environment 150 before the WiFi device 191 moves out of range of and disconnects from the WiFi access point 171. The WiFi device 192 may move towards the entryway to the environment 150 and may enter the environment 150. For example, the WiFi device 192 may be carried by a person arriving at the environment 150. The WiFi device 192 may connect to the WiFi access point 171 some time before the WiFi device 192 enters the environment 150. The WiFi device 193 may move away from the WiFi access point 173 and towards the WiFi access point 172. As the WiFi device 193 moves towards the WiFi access point 172, the WiFi device 193 may disconnect from the WiFi access point 173 and connect to the WiFi access point 172. The WiFi access point 173 may detect the disconnection of the WiFi device 193 after the WiFi device 193 has connected to the WiFi access point 172.

The WiFi access points 171, 172, and 173 may send reports to the cloud computing system 100. The reports may include connect and disconnect times for connections to and disconnections from the WiFi access points 171, 172, and 173 by WiFi devices, such as the WiFi devices 191, 192, and 193. The reports may be sent at any suitable time or interval, or based on any suitable event. For example, the WiFi access points 171, 172, and 173 may send a new report anytime they detect a connection or disconnection of a WiFi device, or may send new reports at intervals of any suitable length. The reports may identify WiFi devices using a privacy preserving identifier, such as, for example, an SHMAC determined for the WiFi devices. For example, the WiFi access point 171 may send a report to the cloud computing system 100 at the time the WiFi device 191 initially connects to the WiFi access point 171. The report may include an SHMAC for the WiFi device 191, an identifier for the WiFi access point 171, an indication that a connection is being reported, and a time of the connection. The WiFi access point 171 may similarly send a report upon determining that the WiFi device 191 has disconnected from the WiFi access point 171, for example, as the WiFi device 191 moves away from the environment 150 and out of the range of the WiFi access point 171. The WiFi access point 171 may send a report to the cloud computing system 100 that reports the connection of the WiFi device 192, which may be outside the environment 150 at the time of the connection. The WiFi access point 172 may send a report to the cloud computing system 100 that report the connection of the WiFi device 193. The WiFi access point 173 may send a reports to the cloud computing system 100 that report the initial connection of the WiFi device 193 and the subsequent disconnection of the WiFi device 193.

The cloud computing system 100 may include a report processor 110. The report processor 110 may be any suitable combination of hardware and software for receiving reports from WiFi access points, such as the WiFi access points 171, 172, and 173, and processing the reports to generate the connect/disconnect times 146. The report processor 110 may receive the reports from the WiFi access points 171, 172, and 173 generated based on the connections and disconnections of the WiFi devices 191, 192, and 193. The connect and disconnect times in the reports may be added to the connect/disconnect times 146 along with data identifying the WiFi access points that generated the reports from which the connect and disconnect times were taken and the WiFi device each connect time and disconnect time was reported for. The WiFi devices may be identified by, for example, SHMAC or any other privacy-preserving identifier. The connect/disconnect times 146 may be updated each time a report is received by the report processor 110. The connect/disconnect times 146 generated and updated by the report processor 110 may be stored in the storage 140 in any suitable format, and may be stored as part of machine learning input data 145.

The cloud computing system 100 may include a machine learning system 120. The machine learning system 120 may be any suitable combination of hardware and software for implementing any suitable machine learning system using any suitable models to determine arrival and departure latencies. The machine learning system 120 may be, for example, an artificial neural network such as a deep learning neural network, a Bayesian network, support vector machine, classifier of any type, or any other suitable statistical or heuristic machine learning system type. The machine learning system 120 may receive, as input, the machine learning input data 145, and may output data indicating the length of the arrival and departure latencies for the environment 150. The machine learning system 120 may output a single arrival latency and a single departure latency or the environment 150 that may be used for all WiFi devices, may output per-WiFi device arrival and departure latencies, may output per entryway arrival and departure latencies, or may output per-WiFi device and entryway arrival and departure latencies. The machine learning system 120 may use machine learning input models 141, including an arrival model 142 and a departure model 143. The arrival model 142 may be a machine learning model, in any format suitable for the machine learning system 120, for determining an arrival latency based on the machine learning input data 145. The departure model 143 may be a machine learning model, in any format suitable for the machine learning system 120, for determining a departure latency based on the machine learning input data 145. The machine learning system 120 may be implemented using any suitable type of learning, including, for example, supervised or unsupervised online learning or offline learning.

The machine learning input data 145 may be input to the machine learning system 120 in any suitable manner. For example, all of the machine learning input data 145 may be input to the machine learning system 120 at the same time, including connect/disconnect times for all WiFi devices, for example, the WiFi devices 191, 192, and 193 from reports from all of the WiFi access points, for example, the WiFi access points 171, 172, and 173, in the environment 150. The machine learning input data 145, including all of the data in the connect/disconnect times 146 and sensor and device data 147 may be input to the arrival model 142 while the arrival model 120 is in use by the machine learning system 120. The machine learning system 120 may output data indicating a length of the arrival latency for the environment 150, as determined by the arrival model 142. The machine learning input data 145 may also be input to the departure model 143 while the departure model 143 is in use by the machine learning system 120. The machine learning system 120 may output data indicating a length of the departure latency for the environment 150, as determined by the departure model 143. The arrival latency and departure latency for the environment 150 may be used with every WiFi device that connects to and disconnects from WiFi access points in the environment 150, for example, when making adjustments to presence and absence determinations for users in the environment 150 made using the connections and disconnections of the WiFi devices.

The machine learning input data 145 may also be divided into sets of input data, with each separate set of input data including data regarding a separate WiFi device. A first set of input data may, for example, include data regarding the WiFi device 191, while a second set of input data may include data regarding the WiFi device 192. Each set of input data may be input to the machine learning system 120 separately. For example, the first set of input data, including data for the WiFi device 191, may be input to the machine learning system 120. The machine learning system 120, using the arrival model 142 and the departure model 143, may output data indicating the lengths of the arrival latency and a departure latency for the WiFi device 191 in relation to the environment 150. The machine learning system 120 may output data indicating the lengths of arrival and departure latencies in relation to the environment 150, for example, one pair of arrival latency and departure latency, for each of the WiFi devices 191, 192, and 193 for which a set of input data is input to the machine learning system 120. The arrival and departure latencies may be used on a per WiFi device basis. For example, the arrival and departure latencies for the WiFi device 191 may be used when adjusting presence and absence determinations made using the connections to and disconnections from WiFi access points in the environment 150 by the WiFi device 191. The arrival and departure latencies for the WiFi device 192, determined separately from those determined for the WiFi device 191, may be used when adjusting presence and absence determinations made using the connections to and disconnections from WiFi access points in the environment 150 by the WiFi device 192.

The machine learning input data 145 may also be divided into sets of input data, with each separate set of input data including data regarding a separate entryway. The environment 150 may have multiple entryways, for example, external doors, and the sensor and device data 147 may include indications of which entryway the various sensors and devices in the environment 150 are nearest to. For example, some of the sensor and device data 147 may be from sensors and devices indicated to be near a first external door of the environment 150, and some of the sensor and device data 147 may be from sensors and devices near a second external door of the environment 150. A first set of input data may, for example, include data regarding the first external door, while a second set of input data may include data regarding the second external door. Each set of input data may be input to the machine learning system 120 separately. For example, the first set of input data, including data for the first external door, may be input to the machine learning system 120. The machine learning system 120, using the arrival model 142 and the departure model 143, may output data indicating the lengths of the arrival latency and a departure latency for the first external door of the environment 150. The machine learning system 120 may similarly output arrival and departure latencies for the second external door of the environment 150 using the set of input data that includes data regarding the second external door. The arrival and departure latencies may be used on a per entryway basis, based on, for example, the WiFi access point that is known to be closest to the entryway. For example, the WiFi access point 171 may be closest to the first external door, and the arrival and departure latencies for the first external door may be used when adjusting presence and absence determinations made using the connections to and disconnection from the WiFi access point 171. The WiFi access point 172 may be closest to the second external door, and the arrival and departure latencies for the second external door may be used when adjusting presence and absence determinations made using the connections to and disconnections from the WiFi access point 172.

The lengths of time determined for arrival and departure latencies for the environment 150 may be based on, for example, correlations between the different types of data in the machine learning input data 145, and patterns in the data regarding connections to and disconnections from the WiFi access points of the environment 150 and signals from the sensors and other devices 159 that indicate a person's arrival into the environment 150 or departure from the environment 150. For example, if the machine learning input data 145 includes data where many connections to the WiFi access point 171 by a WiFi device are followed three to seven seconds later by an entryway sensor detecting a door opening, and a motion sensor near the door detecting motion, the arrival model 142 of the machine learning system 120 may determine an arrival latency for the environment 150 somewhere in the range of three to seven seconds, for example, five seconds. Similarly, if the machine learning input data 145 includes data where disconnections from the WiFi access point 172 occur four to eight seconds after an entryway sensor detects a door opening and a motion sensor near the door detects motion, the departure model 143 of the machine learning system 120 may determine a departure latency for the environment 150 somewhere in the range of four to eight seconds, for example, six seconds.

The machine learning input data 145 may be continually updated as new data is received from, for example, the report processor 110. The updated machine learning input data 145 may be used as input to the machine learning system 120, which may generate new arrival and departure latencies. New arrival and departure latencies may be generated at any suitable times and intervals.

The arrival and departure latencies for the environment 150 may be used in any suitable manner. For example, the arrival and departure latencies may be used to adjust presence and absence determinations made for persons in the environment 150 by the cloud computing system 100 based on WiFi device connections and disconnections. For example, the arrival latency for the environment 150 may be determined to be five seconds. The WiFi device 191 may be detected connecting to the WiFi access point 171 after cloud computing system 100 has determined the user of the WiFi device 191 is absent from the environment 150. The cloud computing system 100, instead of updating the presence or absence determination for the user of the WiFi device 191 to present upon detecting the WiFi device 191 connecting to the WiFi access point 171, may wait for the length of the arrival latency, for example, five seconds, and then update the presence and absence determination for the user to present. This may correspond more closely to the time at which the user of the WiFi device 191 enters into the environment 150. A determination that a user is absent based on a disconnection from the WiFi access point 171 may be retroactively adjusted by the cloud computing system 100 using the delay latency, increasing the total time of absence by the delay latency. This may provide a more accurate accounting of when and how long users are absent from the environment 150. The delay latency may also be used to adjust the timing of actions by controllable devices that based on presence and absence determinations. For example, a delay on security system entering a disarmed mode on detection of an arrival of a person when the WiFi device 191 connects to the WiFi access point 171 may be increased by the arrival latency, so that the security system disarms closer to the time when the person carrying the WiFi device 191 reaches the entryway to the environment 150. The delay on the security system entering an armed mode based on detection of a departure of person when the WiFi device 191 disconnects from the WiFi access point 181 may be decreased by the departure latency, so that the security system of the environment 150 rearms after the delay time counted from when the person departs the environment 150 carrying the WiFi device 191, rather rearming after the length of the delay latency plus the length of the delay time for the security system.

A hub computing device 155 may include a signal receiver 156. The hub computing device 155 may be any suitable device, such as, for example, a computer 20 as described in FIG. 7, for implementing the signal receiver 156. The hub computing device 155 may be, for example, a controller 73 as described in FIG. 5. The hub computing device 155 may be a single computing device, or may include multiple connected computing devices, and may be, for example, a thermostat, other sensor, phone, tablet, laptop, desktop, television, watch, or other computing device that may act as a hub for an environment 150, which may include a security system and automation functions. The environment 150 may be, for example, a home, office, or other environment. The environment 150 may be controlled from the hub computing device 155. The hub computing device 155 may be connected to various sensors throughout an environment as well as to various systems within the environment 150, such as HVAC systems. The hub computing device 155 may include any suitable hardware and software interfaces through which a user may interact with the hub computing device 155. The hub computing device 155 may be located within the environment 150, may be located offsite, or may include computation devices both in the environment 150 and offsite. An onsite hub computing device 155 may use computation resources from other computing devices throughout the environment 150 or connected remotely, such as, for example, as part of a cloud computing platform.

The signal receiver 156 may be any suitable combination of hardware or software on the hub computing device 155 for receiving signals generated by sensors and other devices that may be in the environment 150 and may be connected to the hub computing device 155. For example, the signal receiver 156 may receive signals from sensors and devices 159 that may be distributed throughout the environment 150. The sensors and devices 159 may be, for example, motion sensors, entryway sensors, cameras, microphones, light sensors, contact sensors, tilt sensors, WiFi or Bluetooth detectors, lights, appliances, A/V equipment, HVAC systems, security systems, or any other suitable sensor or device types in the environment 150. The signals received by the signal receiver 156 from the sensors and devices 159 may include, for example, open/close events detected by entryway sensors that monitor external doors of the environment 150 motion detected by motion sensors that monitor areas around the external doors of the environment 150, data indicating when devices, including lights, appliances, and A/V equipment, have been turned on or off based on input from a user, rather than through automated control by the hub computing device 155 or cloud computing system 100, and any other suitable data that may be indicative of whether a user is present in, absent from, entering, or leaving, the environment 150. The signals may include, for example, signals and other data generated by the sensors and devices 159 based on active output from the sensors or lack out active output from the sensors. For example, a motion sensor may generate active output when it detects motion, and may have a lack of active output when it does not detect motion.

The signal receiver 156 may transmit signals received from the sensors and devices 159 of the environment 150 to the cloud computing system 100. The cloud computing system 100 may store the signals in the storage 140 as the sensor and device data 147. The sensor and device data 147 may be stored as part of machine learning input data 145.

In some implementations, the machine learning system 120 may be run on the hub computing device 155. The machine learning input data 145 may be stored in a storage of the hub computing device 155 instead of the storage 140 of the cloud computing system 100, or the storage 140 may be accessible to the hub computing device 155. If the machine learning input data 145 is stored on the hub computing device 155, the hub computing device 155 may receive the reports from the WiFi access points of the environment 150, and may include a report processor similar to the report processor 110 to generate the connect/disconnect times 146. The lengths of the arrival and departure latencies, as output by the machine learning system 120, may be transmitted to the cloud computing system 100 or may be used by the hub computing device 400.

Figure 2A:
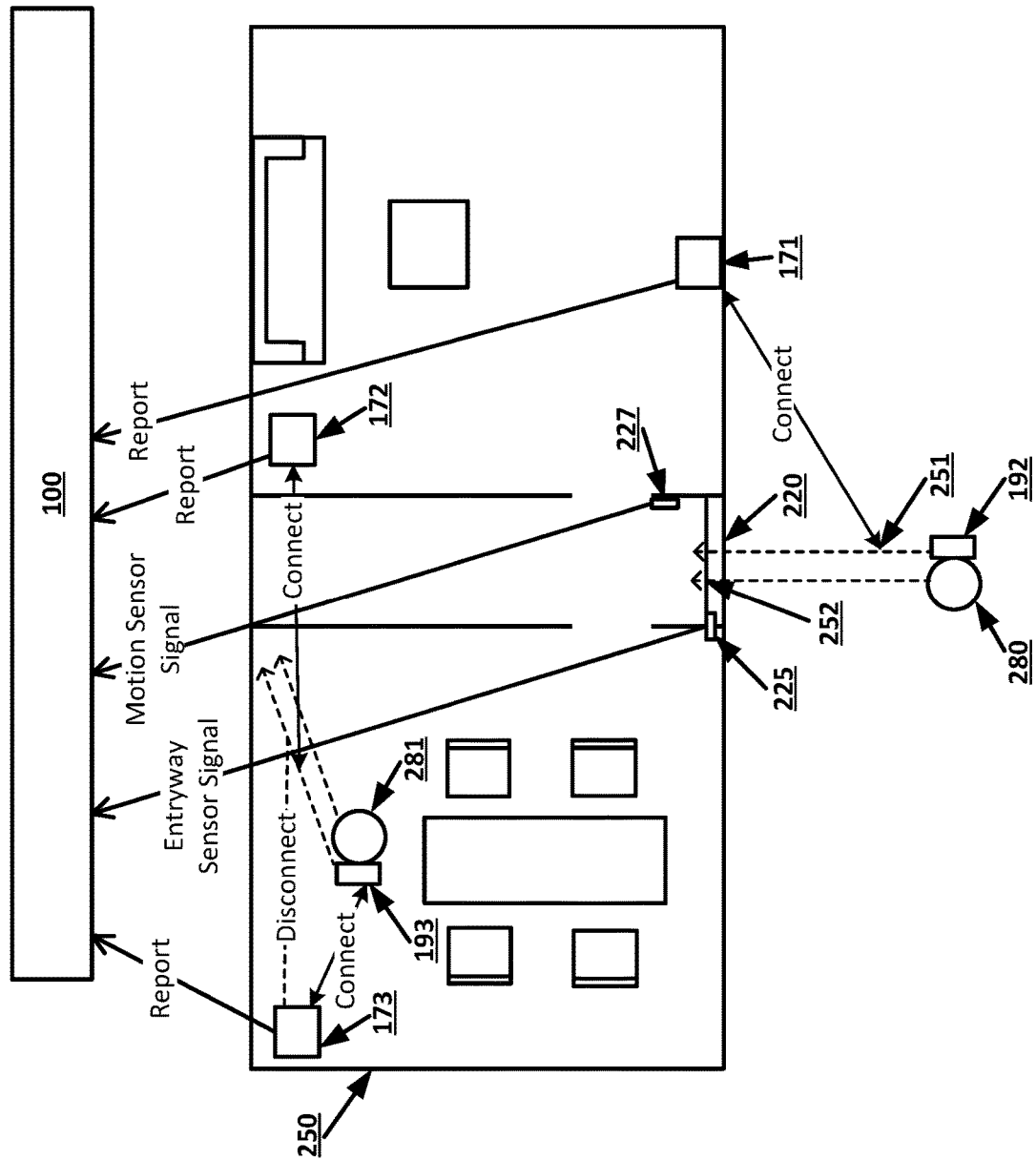
FIG. 2A shows an example environment suitable for determining arrival and departure latency for WiFi devices according to an implementation of the disclosed subject matter.

FIG. 2A shows an example environment suitable for determining arrival and departure latency for WiFi devices according to an implementation of the disclosed subject matter. An environment 150 may include an entryway 220, which may be, for example, an external door used to enter and exit the environment 150. An entryway sensor 225 may be positioned to monitor the opening and closing of the entryway 220. A motion sensor 227 may be positioned to detect motion that occurs in a hallway of the environment 150 directly behind the entryway 220. The WiFi access points 171, 172, and 173 may be positioned throughout the environment 150.

A person 280 carrying the WiFi device 192 may approach the entryway 220 from outside the environment 150. The WiFi device 192 may connect to the WiFi access point 171 at point 251, which may be located outside of the environment 150, before the person 280 has entered the environment 150 through the entryway 220. The WiFi access point 171 may send a report to the cloud computing system 100 that indicates the connection of the WiFi device 192, including the time of the connection. The report processor 110 may process the report from the WiFi access point 171 and may add the time the connection was detected, an identifier of the WiFi access point 171, and an identifier of the WiFi device 192 to the connect/disconnect times 146 in the machine learning input data 145.

When the person 280 enters the environment 150 through the entryway 220 at point 252, the entryway sensor 225 may generate sensor data showing an opening and then closing of the entryway 220. The sensor data may be sent to the signal receiver 156 on the hub computing device 155, which may in turn send the sensor data from the entryway sensor 225 to the hub computing device 100 where it may be stored as part of the sensor and device data 147. The motion sensor 227 may detect motion of the person 280 in the hallway behind the entryway 220 and may send sensor data indicating the detection of motion to the signal receiver 156 on the hub computing device 155. The hub computing device 155 may send the sensor data from the motion sensor 227 to the hub computing device 100 where it may be stored as part of the sensor and device data 147 in the machine learning input data 145.

A person 281 carrying the WiFi device 193 may be in the environment 150. The WiFi device 193 may initially be connected to the WiFi access point 173. The person may move towards the WiFi access point 172. The WiFi device 193 may connect to the WiFi access point 172 and disconnect from the WiFi access point 173. The WiFi access point 173 may detect the disconnection of the WiFi device 193 some time after the disconnection has occurred on the WiFi device 193 and the WiFi device 193 has connected to the WiFi access point 172. The WiFi access point 173 may send reports to the cloud computing system 100 reporting the initial connection and later disconnection of the WiFi device 193, including the times at which the WiFi access point 173 detected the connection and disconnection. The WiFi access point 172 may send a report to the cloud computing system 100 reporting the connection of the WiFi device 193. The report processor 110 of the hub computing device 100 may process the reports and add the connect and disconnect times, and associated identifiers, to the connect/disconnect times 146 in the machine learning input data 145.

The machine learning input data 145 may be input to the machine learning system 120, which may use the arrival model 142 to determine an arrival latency for the environment 150. The arrival latency for the environment 150, as determined by the machine learning system 120, may be, for example, an estimate of the length of time between when a WiFi device, such as the WiFi device 191, connects to the WiFi access point 171 at a point outside the environment 150, for example, at the point 251, and a person carrying the WiFi device, such as the person 281, enters the environment 150 through the entryway 220, for example, at the point 252.

Figure 2B:
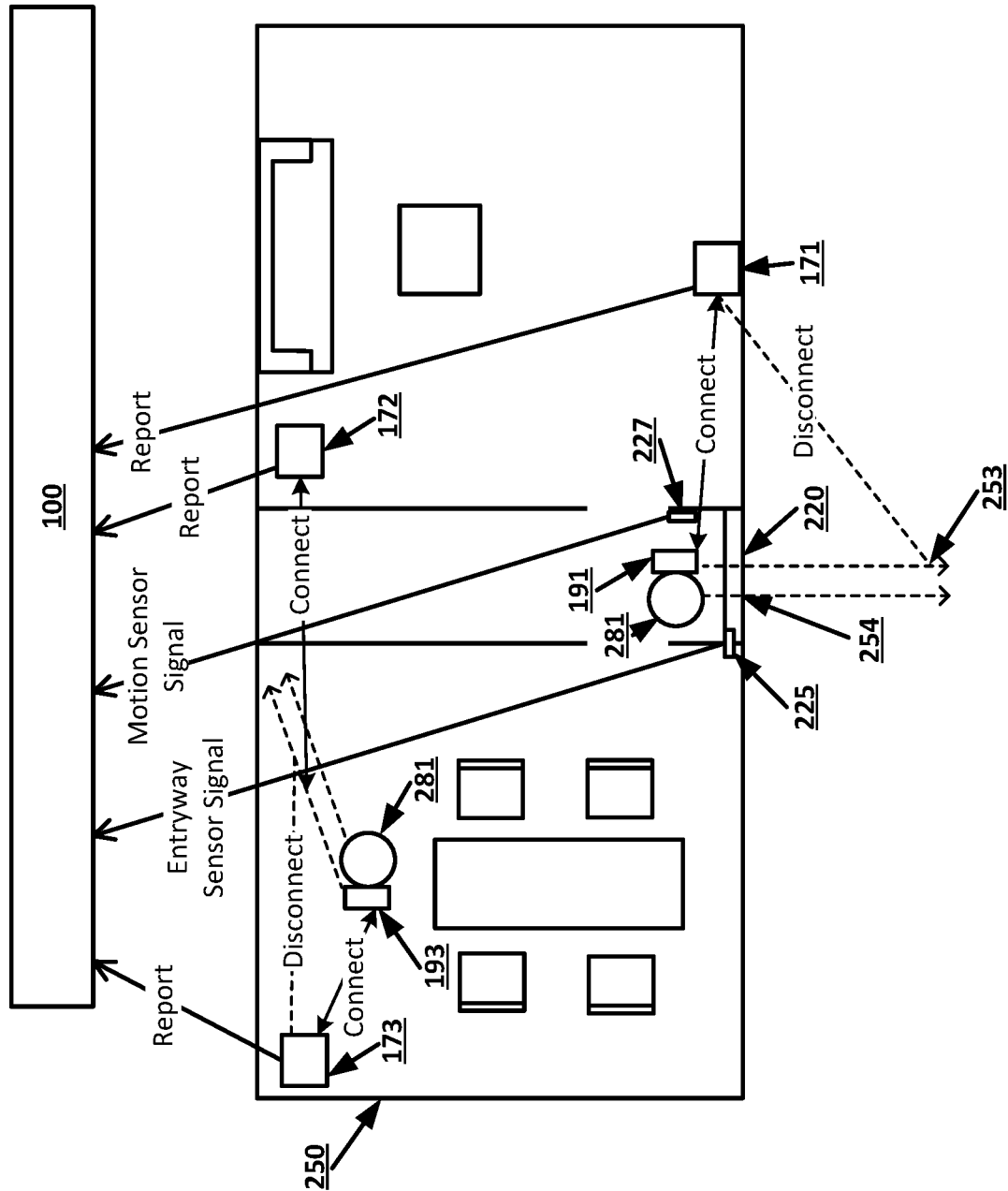
FIG. 2B shows an example environment suitable for determining arrival and departure latency for WiFi devices according to an implementation of the disclosed subject matter.

FIG. 2B shows an example environment suitable for determining arrival and departure latency for WiFi devices according to an implementation of the disclosed subject matter. A person 282 carrying the WiFi device 191 may approach the entryway 220 from inside the environment 150. The WiFi device 191 may be connected to the WiFi access point 171. The person may exit the environment 150 through the entryway 220 at point 254, and move away from the environment 150. The WiFi device 191 may remain connected to the WiFi access point 171 until the person 282 has reached point 253, which may be located some distance from the entryway 220 outside of the environment 150, at which time the WiFi device 191 may disconnect from the WiFi access point 171. The WiFi access point 171 may detect the disconnection of the WiFi device 191 some amount of time after the disconnection occurs on the WiFi device 191, and may send a report to the cloud computing system 100 that indicates the disconnection of the WiFi device 191, including the time of the disconnection. The report processor 110 may process the report from the WiFi access point 171 and may add the time the disconnection was detected, an identifier of the WiFi access point 171, and an identifier of the WiFi device 191 to the connect/disconnect times 146 in the machine learning input data 145.

When the person 282 leaves the environment 150 through the entryway 220 at point 252, the entryway sensor 225 may generate sensor data showing an opening and then closing of the entryway 220. The sensor data may be sent to the signal receiver 156 on the hub computing device 155, which may in turn send the sensor data from the entryway sensor 225 to the hub computing device 100 where it may be stored as part of the sensor and device data 147. The motion sensor 227 may detect motion of the person 282 in the hallway behind the entryway 220 before the entryway 220 is opened, and may send sensor data indicating the detection of motion to the signal receiver 156 on the hub computing device 155. The hub computing device 155 may send the sensor data from the motion sensor 227 to the hub computing device 100 where it may be stored as part of the sensor and device data 147 in the machine learning input data 145.

The machine learning input data 145, updated with the reports from the WiFi access point 171 and the data from the entryway sensor 225 and motion sensor 227 may be input to the machine learning system 120, which may use the departure model 143 to determine a departure latency for the environment 150. The departure latency for the environment 150, as determined by the machine learning system 120, may be, for example, an estimate of the length of time between when a person carrying a WiFi device, such as the WiFi device 191, exits the environment 150, and the WiFi device disconnects from the WiFi access point 171 at a point outside the environment 150, for example, at the point 253, and the disconnection is detected by the WiFi access point 171.

Figure 3:
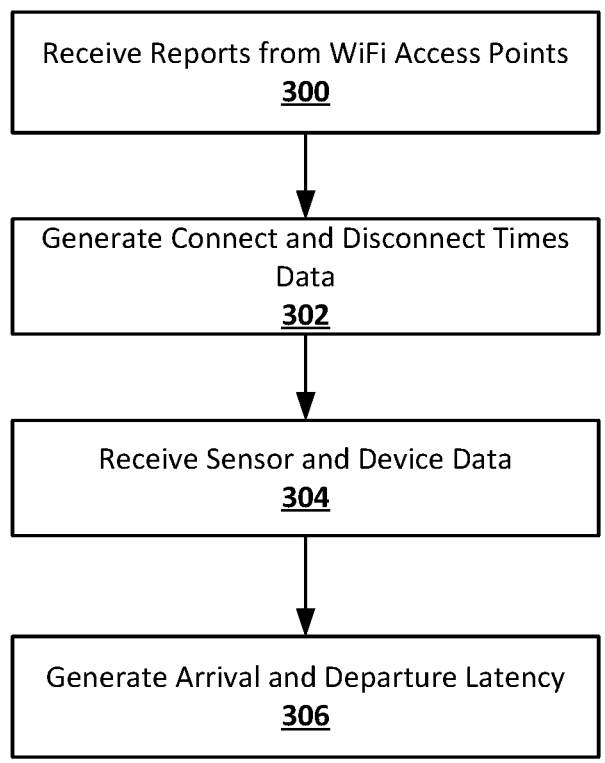
FIG. 3 shows an example process suitable for determining arrival and departure latency for WiFi devices according to an implementation of the disclosed subject matter.

FIG. 3 shows an example of a process suitable for determining arrival and departure latency for WiFi devices according to an implementation of the disclosed subject matter. At 300, reports regarding the times WiFi devices connect to and disconnect from WiFi access points in an environment may be received at a cloud computing system from the WiFi access points.

At 302, data for connect times and disconnect times of the WiFi may be generated from the reports.

At 304, sensor and device data may be received at the cloud computing system and stored with the machine learning input data.

At 306, data indicating the length of arrival and departure latencies may be generated by the machine learning system using the data for connect and disconnect times and sensor and device data.

Reports may be received from WiFi access points in an environment. Each of the reports may include an indication of a connection to or disconnection from one of the WiFi access points, a time of the connection or disconnection, and an identifier of the one of the WiFi access points. Data including connect times and disconnect times may be generated from the reports. Sensor and device data may be received from sensors or devices in the environment. Data indicating a length of an arrival latency and a length of a departure latency for the environment may be generated with a machine learning system, where the data including connect times and disconnect times and the sensor and device data is input to the machine learning system.

An indication of presence or an indication of absence for a user in the environment may be adjusted with the arrival latency or the departure latency.

A control signal for a controllable device in the environment may be generated based on the indication of presence or the indication absence after the adjusting of at least one of the indication of presence and the indication of absence. The control signal may be sent to the device to be implemented by the device.

The machine learning system may use an arrival model to generate the arrival latency. The machine learning system may use a departure model to generate the departure latency.

The report further may include an identifier of the WiFi device. The identifier of the WiFi device may include a salted hashed media access control address (SHMAC).

The sensors and devices in the environment may include a motion sensor or an entryway sensor.

The reports may include an identifier of a WiFi device. Data indicating a length of an arrival latency and a length of a departure latency may be generated with the machine learning system for each WiFi device with an identifier in one of the reports, where the data including connect times and disconnect times and the sensor and device data is input to the machine learning system.

A system may include WiFi access points in an environment and a computing device of a cloud computing system that may receive, from the WiFi access points in an environment, reports, wherein each of the reports includes an indication of a connection to or disconnection from one of the WiFi access points, a time of the connection or disconnection, and an identifier of the one of the WiFi access points, generate, from the reports, data including connect times and disconnect times, receive, from one or more sensors or devices in the environment, sensor and device data, and generate, with a machine learning system, data indicating a length of an arrival latency and a length of a departure latency for the environment, wherein the data including connect times and disconnect times and the sensor and device data is input to the machine learning system.

The computing device of the cloud computing system may adjust an indication of presence or an indication of absence for a user in the environment with at the arrival latency or the departure latency.

The computing device of the cloud computing system may generate a control signal for a controllable device in the environment based on the indication of presence or the indication absence after the computing device adjusts the indication of presence or the indication of absence, and may send the control signal to the device to be implemented by the device.

The machine learning system may use an arrival model to generate the arrival latency, and may use a departure model to generate the departure latency.

The report may include an identifier of the WiFi device, and wherein the identifier of the WiFi device includes a salted hashed media access control address (SHMAC).

The sensors and devices in the environment may include a motion sensor or an entryway sensor.

The reports may include an identifier of a WiFi device. The computing device of the cloud computing system may generate, with the machine learning system, data indicating a length of an arrival latency and a length of a departure latency for each WiFi device with an identifier in one of the reports, wherein the data includes connect times and disconnect times and the sensor and device data is input to the machine learning system.

According to an embodiment of the disclosed subject matter, a means for receiving, from WiFi access points in an environment, reports, wherein each of the reports may include an indication of a connection to or disconnection from one of the WiFi access points, a time of the connection or disconnection, and an identifier of the one of the WiFi access points, a means for generating, from the reports, data including connect times and disconnect times, a means for receiving, from one or more sensors or devices in the environment, sensor and device data, a means for generating, with a machine learning system, data indicating a length of an arrival latency and a length of a departure latency for the environment, wherein the data may include connect times and disconnect times and the sensor and device data is input to the machine learning system, a means for generating a control signal for a controllable device in the environment based on the indication of presence or the indication absence after the adjusting of at least one of the indication of presence and the indication of absence, a means for sending the control signal to the device to be implemented by the device, and a means for generating, with the machine learning system, data indicating a length of an arrival latency and a length of a departure latency for each WiFi device with an identifier in one of the reports, wherein the data including connect times and disconnect times and the sensor and device data is input to the machine learning system, are included.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 4:
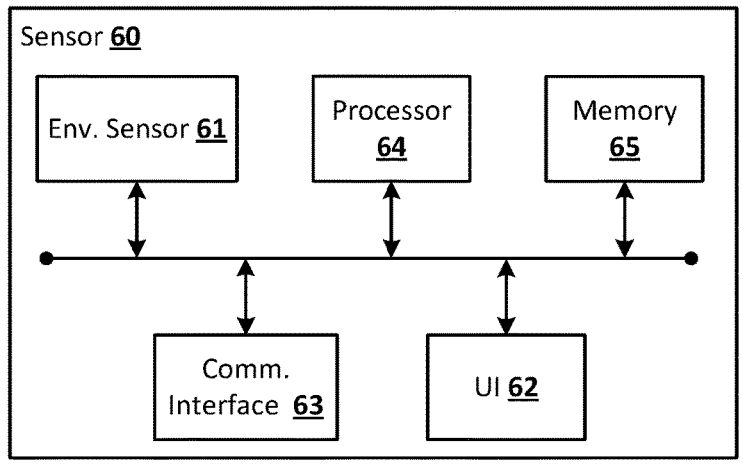
FIG. 4 shows a computing device according to an embodiment of the disclosed subject matter.

A sensor may include hardware in addition to the specific physical sensor that obtains information about the environment. FIG. 4 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 5:
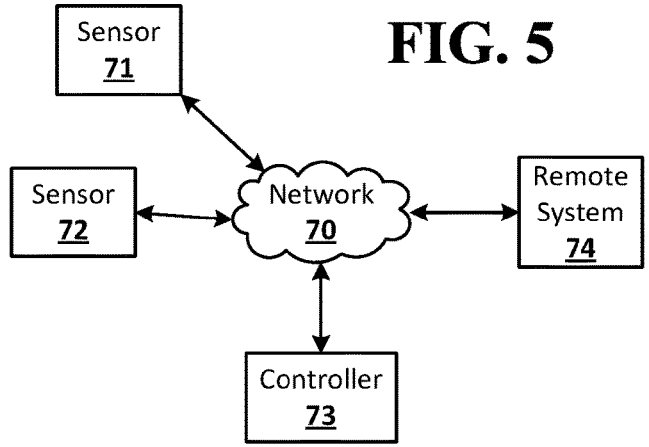
FIG. 5 shows a system according to an embodiment of the disclosed subject matter.
Figure 6:
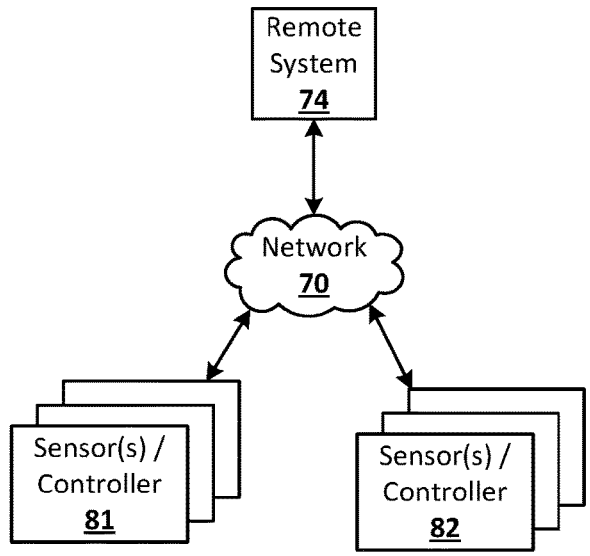
FIG. 6 shows a system according to an embodiment of the disclosed subject matter.

FIG. 5 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 155 may be an example of a controller 73 and the sensors 210 may be examples of sensors 71 and 72, as shown and described in further detail with respect to FIGS. 1-8.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 5 may be an example of a smart-home environment. The depicted smart-home environment may include an environment, a house, office building, garage, mobile home, or the like. The devices of the smart environment, such as the sensors 71, 72, the controller 73, and the network 70 may be integrated into a smart-home environment that does not include an entire environment, such as an apartment, condominium, or office space.

The smart environment can control and/or be coupled to devices outside of the environment. For example, one or more of the sensors 71, 72 may be located outside the environment, for example, at one or more distances from the environment (e.g., sensors 71, 72 may be disposed outside the environment, at points along a land perimeter on which the environment is located, and the like. One or more of the devices in the smart environment need not physically be within the environment. For example, the controller 73 which may receive input from the sensors 71, 72 may be located outside of the environment.

The environment of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the environment.

The smart-home environment including the sensor network shown in FIG. 5 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 5.

According to embodiments of the disclosed subject matter, the smart thermostat may detect ambient climate characteristics (e.g., temperature and/or humidity) and may control an HVAC (heating, ventilating, and air conditioning) system accordingly of the environment. For example, the ambient client characteristics may be detected by sensors 71, 72 shown in FIG. 5, and the controller 73 may control the HVAC system (not shown) of the environment.

A smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 5, and the controller 73 may control an alarm system to provide a visual and/or audible alarm to the user of the smart-home environment.

A smart doorbell may control doorbell functionality, detect a person's approach to or departure from a location (e.g., an outer door to the environment), and announce a person's approach or departure from the environment via audible and/or visual message that is output by a speaker and/or a display coupled to, for example, the controller 73.

In some embodiments, the smart-home environment of the sensor network shown in FIG. 5 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be the sensors 71, 72 shown in FIG. 5. The smart wall switches may detect ambient lighting conditions, and control a power and/or dim state of one or more lights. For example, the sensors 71, 72, may detect the ambient lighting conditions, and the controller 73 may control the power to one or more lights (not shown) in the smart-home environment. The smart wall switches may also control a power state or speed of a fan, such as a ceiling fan. For example, sensors 72, 72 may detect the power and/or speed of a fan, and the controller 73 may adjusting the power and/or speed of the fan, accordingly. The smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). The sensors 71, 72 shown in FIG. 5 may be the smart entry detectors. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 5 can include one or more intelligent, multi-sensing, network-connected doorknobs (e.g., "smart doorknob"). For example, the sensors 71, 72 may be coupled to a doorknob of a door (e.g., doorknobs 122 located on external doors of the environment of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of the smart-home environment (e.g., as illustrated as sensors 71, 72 of FIG. 5 can be communicatively coupled to each other via the network 70, and to the controller 73 and/or remote system 74 to provide security, safety, and/or comfort for the smart environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment "learns" who is a user (e.g., an authorized user) and permits the electronic devices associated with those individuals to control the network-connected smart devices of the smart-home environment (e.g., devices communicatively coupled to the network 70). Various types of notices and other information may be provided to users via messages sent to one or more user electronic devices. For example, the messages can be sent via email, short message service (SMS), multimedia messaging service (MMS), unenvironmentd supplementary service data (USSD), as well as any other type of messaging services and/or communication protocols.

The smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 4 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 7:
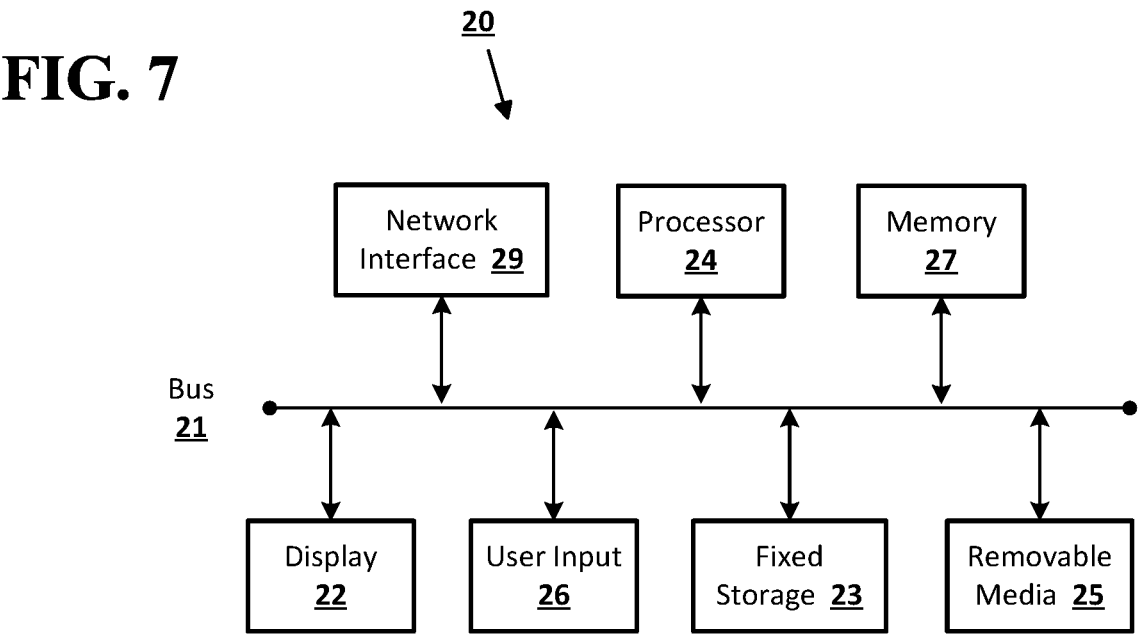
FIG. 7 shows a computer according to an embodiment of the disclosed subject matter.

Embodiments of the presently disclosed subject matter may be implemented in and used with a variety of computing devices. FIG. 7 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 8:
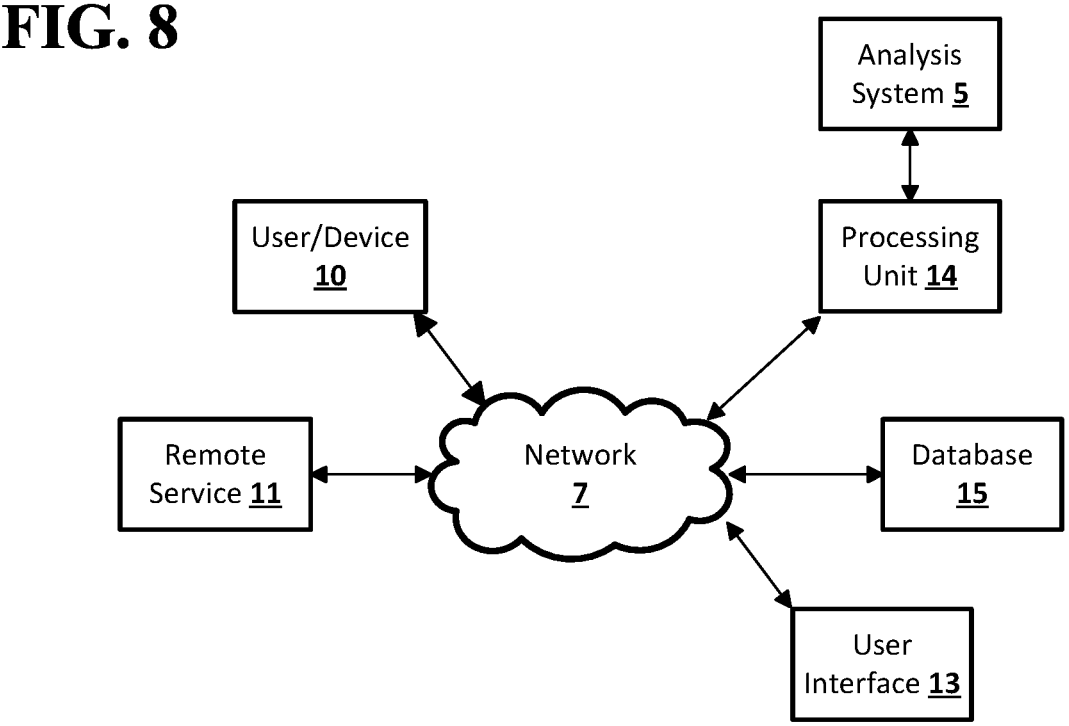
FIG. 8 shows a network configuration according to an embodiment of the disclosed subject matter.

FIG. 8 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving, from WiFi access points in an environment, through a network connection, reports, wherein a report comprises an indication of a connection to or disconnection from one of the WiFi access points by a WiFi device different from the WiFi access points, a time of the connection or disconnection, and an identifier of the one of the WiFi access points;
   generating, from the reports, data comprising connect times and disconnect times;
   receiving, from one or more sensors or devices in the environment, through the network connection or another network connection, sensor and device data; and
   generating, with a machine learning system, data indicating a length of an arrival latency and a length of a departure latency for the environment, wherein the data comprising the connect times and the disconnect times and the sensor and device data is input to the machine learning system.

2. The computer-implemented method of claim 1, further comprising adjusting at least one of an indication of presence and an indication of absence for a user in the environment with at least one of the arrival latency and the departure latency.

3. The computer-implemented method of claim 2, further comprising:
   generating a control signal for a controllable device in the environment based on the indication of the presence or the indication of the absence after the adjusting of at least one of the indication of the presence and the indication of the absence; and
   sending the control signal to the device to be implemented by the device.

4. The computer-implemented method of claim 1, wherein the machine learning system uses an arrival model to generate the arrival latency, and wherein the machine learning system uses a departure model to generate the departure latency.

5. The computer-implemented method of claim 1, wherein the report further comprises an identifier of the WiFi device, wherein the WiFi device is different from the WiFi access points, and wherein the identifier of the WiFi device comprises a salted hashed media access control address (SHMAC).

6. The computer-implemented method of claim 1, wherein the one or more sensors and devices in the environment comprise one or more of a motion sensor and entryway sensor.

7. The computer-implemented method of claim 1, wherein each of the reports further comprises an identifier of the WiFi device, wherein the WiFi device is different from the WiFi access points, and further comprising:
  generating, with the machine learning system, data indicating the length of the arrival latency and the length of the departure latency for each of the WIFI device with an identifier in one of the reports, wherein the data comprising the connect times and the disconnect times and the sensor and the device data is input to the machine learning system.

8. A computer-implemented system determining arrival and departure latency for WiFi devices comprising:
  a computing device of a cloud computing system that receives, from one or more WiFi access points in an environment, through a network connection, reports, wherein each of the reports comprises an indication of a connection to or disconnection from one of the WiFi access points by a WiFi device different from the WiFi access points, a time of the connection or disconnection, and an identifier of the one of the WiFi access points,
  generates, from the reports, data comprising connect times and disconnect times, receives, through the network connection or another network connection, from one or more sensors or devices in the environment, sensor and device data, and
  generates, with a machine learning system, data indicating a length of an arrival latency and a length of a departure latency for the environment, wherein the data comprising the connect times and the disconnect times and the sensor and device data is input to the machine learning system.

9. The computer-implemented system of claim 8, wherein the computing device of the cloud computing system further adjusts at least one of an indication of presence and an indication of absence for a user in the environment with at least one of the arrival latency and the departure latency.

10. The computer-implemented system of claim 9, wherein the computing device of the cloud computing system further generates a control signal for a controllable device in the environment based on the indication of presence or the indication absence after the computing device adjusts at least one of the indication of presence and the indication of absence and sends the control signal to the device to be implemented by the device.

11. The computer-implemented system of claim 8, wherein the machine learning system uses an arrival model to generate the arrival latency, and wherein the machine learning system uses a departure model to generate the departure latency.

12. The computer-implemented system of claim 8, wherein the report further comprises an identifier of the WiFi device, wherein the WiFi device is different from the WiFi access points, and wherein the identifier of the WiFi device comprises a salted hashed media access control address (SHMAC).

13. The computer-implemented system of claim 8, wherein the one or more sensors and devices in the environment comprise one or more of a motion sensor and entryway sensor.

14. The computer-implemented system of claim 8, wherein each of the reports further comprises an identifier of the WiFi device, wherein the WiFi device is different from the WiFi access points, and wherein the computing device of the cloud computing system further generates, with the machine learning system, data indicating the length of an arrival latency and the length of the departure latency for each of the WIFI device with an identifier in one of the reports, wherein the data comprising the connect times and the disconnect times and the sensor and device data is input to the machine learning system.

15. A system comprising: one or more computers and one or more storage devices storing instructions which are operable, when executed by the one or more computers, to cause the one or more computers to perform operations comprising:
  receiving, from WiFi access points in an environment, through a network connection, reports, wherein a report of the reports comprises an indication of a connection to or disconnection from one of the WiFi access points by a WiFi device different from the WiFi access points, a time of the connection or disconnection, and an identifier of the one of the WiFi access points;
  generating, from the reports, data comprising connect times and disconnect times;
  receiving, from one or more sensors or devices in the environment, through the network connection or another network connection, sensor and device data; and
  generating, with a machine learning system, data indicating a length of an arrival latency and a length of a departure latency for the environment, wherein the data comprising the connect times and the disconnect times and the sensor and the device data data is input to the machine learning system.

16. The system of claim 15, wherein the instructions further cause the one or more computers to perform operations comprising adjusting at least one of an indication of presence and an indication of absence for a user in the environment with at least one of the arrival latency and the departure latency.

17. The system of claim 16, wherein the instructions further cause the one or more computers to perform operations comprising:
  generating a control signal for a controllable device in the environment based on the indication of the presence or the indication of the absence after the adjusting of at least one of the indication of the presence and the indication of the absence; and
  sending the control signal to the device to be implemented by the device.

18. The system of claim 15, wherein the machine learning system uses an arrival model to generate the arrival latency, and wherein the machine learning system uses a departure model to generate the departure latency.

19. The system of claim 15, wherein the report further comprises an identifier of the WiFi device, wherein the WiFi device is different from the WiFi access points, and wherein the identifier of the WiFi device comprises a salted hashed media access control address (SHMAC).

20. The system of claim 15, wherein each of the reports further comprises an identifier of the WiFi device, wherein the WiFi device is different from the WiFi access points, and wherein the instructions further cause the one or more computers to perform operations comprising:
generating, with the machine learning system, data indicating the length of the arrival latency and the length of the departure latency for each of the WiFi device with an identifier in one of the reports, wherein the data comprising the connect times and the disconnect times and the sensor and device data is input to the machine learning system.

* * * * *